United States Patent
Takaishi

(10) Patent No.: US 7,433,147 B2
(45) Date of Patent: Oct. 7, 2008

(54) POSITION CONTROL DEVICE, DISK DEVICE, AND POSITION CONTROL METHOD

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 174 days.

(21) Appl. No.: 11/475,440

(22) Filed: Jun. 27, 2006

(65) Prior Publication Data

US 2007/0206315 A1   Sep. 6, 2007

(30) Foreign Application Priority Data

Mar. 3, 2006   (JP)   ............... 2006-057203

(51) Int. Cl.
 *G11B 5/596*   (2006.01)
 *G11B 21/02*   (2006.01)
(52) U.S. Cl. ..................... 360/77.04; 360/75
(58) Field of Classification Search .......... None
See application file for complete search history.

(56) References Cited

U.S. PATENT DOCUMENTS 6,496,322 B1 * 12/2002 Hasegawa et al. ........ 360/77.08

2001/0021077 A1   9/2001   Takaishi
2004/0004783 A1   1/2004   Takaishi et al.

FOREIGN PATENT DOCUMENTS

JP   2004-39116   2/2004
JP   3683155   6/2005

* cited by examiner

*Primary Examiner*—Andrew L. Sniezek
(74) *Attorney, Agent, or Firm*—Greer, Burns & Crain, Ltd.

(57) ABSTRACT

The present invention provides a disk device, a control device, and a positioning control method with which positioning in a target position can be performed without expending time on a seek operation even when virtual circular control is performed using an eccentric disk. Virtual circular orbits, each depicting a perfect circle centered on the rotary center of a disk surface, are determined. An average orbit is then determined by averaging the virtual circular orbits. Orbits obtained by subtracting the average orbit from each virtual circular orbit are set as the position orbits of the respective disk surfaces. An MCU controls an actuator to follow these orbits.

11 Claims, 19 Drawing Sheets

MAGNETIC DISK DEVICE 1

POSITION CONTROL DEVICE, DISK DEVICE, AND POSITION CONTROL METHOD

CROSS-REFERENCE TO RELATED APPLICATIONS

This application is based upon and claims the benefit of priority from the prior Japanese Patent Application No. 2006-057203, filed on Mar. 3, 2006, the entire contents of which are incorporated herein by reference.

BACKGROUND OF THE INVENTION

1. Field of the Invention

The present invention relates to a disk device, a position control device for positioning a head of the disk device in a target position, and a position control method. More particularly, the present invention relates to a disk device and so on with which the head of the disk device can be positioned in the target position without expending time on a seek operation even when an eccentric disk is used.

2. Description of the Related Art

With a disk device for a disk such as an optical disk or magnetic disk, it is extremely important to position the head in a target position accurately. Eccentricity caused by a discrepancy between the center of servo signals recorded concentrically on the disk and the rotary center of a motor may become a hindrance to such positioning.

When a servo signal is recorded on the disk by an external device using a media servo track writing (STW) method or the like, and the servo signal is read by loading the disk into the disk device, eccentricity occurs if the rotary center of the external device disk and the rotary center of the disk device do not match.

A technique known as virtual circular control, in which control is performed to ignore eccentricity, has been proposed as a technique of avoiding eccentricity (Japanese Patent No. 3,683,155 and Japanese Patent Laid-Open No. 2004-39116, for example).

According to this prior art, virtual circular control is a control method in which the head is moved so as to follow a perfectly circular track relative to the rotary center of the disk.

However, even when virtual circular control is performed, the current position cannot be demodulated correctly when the relative velocity of the eccentric orbit and the virtual circular orbit (the orbit of the head) equals or exceeds a certain value. Hence, the head cannot be positioned accurately in a target position, and a seek operation takes a great deal of time.

SUMMARY OF THE INVENTION

The present invention has been designed in consideration of the problem described above, and it is an object of the present invention to provide a position control device, a disk device, and a position control method with which positioning in a target position can be performed without expending time on a seek operation even when virtual circular control is performed using an eccentric disk.

To achieve this object, one of the present invention is a control device for positioning a head position in relation to a disk, each of which is recorded in advance with a position signal, having a position orbit generation unit which calculates virtual circular orbits of the head, each of which depicts a perfect circle centered on a rotary center of respective disk surfaces of the disks, calculates an average orbit by averaging the virtual circular orbits, and generates position orbits by subtracting the virtual circular orbits from the average orbit.

Further, to achieve this object, one of the present invention is a control device for positioning a head position in relation to a disk, each of which is recorded in advance with a position signal, having a control unit which performs control such that an average orbit is calculated by averaging virtual circular orbits of the head, each of which depicts a perfect circle centered on a rotary center of respective disk surfaces of the disks, a position orbit to each disk surface is calculated by subtracting the virtual circular orbits from the average orbit, the position orbit is subtracted from a demodulated position demodulated from the position signal on each of the disk surfaces, and the head position is positioned in relation to each of the disk surfaces on the basis of a resulting subtraction value.

The control device of the present invention further has a storage unit which stores a correction value corresponding to the average orbit, wherein the control unit calculates the subtraction value by reading the correction value stored in the storage unit and subtracting the correction value from the demodulated position.

Furthermore, in the control device of the present invention, the position orbit to each of the disk surfaces has a different value according to a radial direction position on the disk.

Furthermore, in the control device of the present invention, the correction value has a different value according to a radial direction position on the disk.

Further, to achieve the aforementioned object, one of the present invention is a disk device for positioning a head position in relation to a disk, each of which is recorded in advance with a position signal, having an actuator for driving the head, a control unit which demodulates the position signal from the head and controls the actuator, and a position orbit generation unit which calculates virtual circular orbits of the head, each of which depicts a perfect circle centered on a rotary center of respective disk surfaces of the disks, calculates an average orbit by averaging the virtual circular orbits, and generates position orbits by subtracting the virtual circular orbits from the average orbit.

Further, to achieve the aforementioned object, one of the present invention is a disk device for positioning a head position in relation to a disk, each of which is recorded in advance with a position signal, having an actuator for driving the head, and a control unit which demodulates the position signal from the head and controls the actuator, wherein the control unit controls the actuator such that an average orbit is calculated by averaging virtual circular orbits of the head, each of which depicts a perfect circle centered on a rotary center of respective disk surfaces of the disks, a position orbit to each disk surface is calculated by subtracting the virtual circular orbits from the average orbit, the position orbit is subtracted from a demodulated position demodulated from the position signal on each of the disk surfaces, and the head position is positioned in relation to each of the disk surfaces on the basis of a resulting subtraction value.

Further, to achieve the aforementioned object, one of the present invention is a position orbit generating method for generating a position orbit in order to position a head position in relation to a disk, each of which is recorded in advance with a position signal, the method having the step of calculating virtual circular orbits of the head, each of which depicts a perfect circle centered on a rotary center of respective disk surfaces of the disks, calculating an average orbit by averaging the virtual circular orbits, and generating position orbits by subtracting the virtual circular orbits from the average orbit.

Further, to achieve the aforementioned object, one of the present invention is a positioning control method for positioning a head position in relation to a disk, each of which is recorded in advance with a position signal, the method having the step of performing control such that an average orbit is calculated by averaging virtual circular orbits of the head, each of which depicts a perfect circle centered on a rotary center of respective disk surfaces of the disks, a position orbit to each disk surface is calculated by subtracting the virtual circular orbits from the average orbit, the position orbit is subtracted from a demodulated position demodulated from the position signal on each of the disk surfaces, and the head position is positioned in relation to each of the disk surfaces on the basis of a resulting subtraction value.

The present invention provides a disk device, a control device, and a positioning control method with which positioning in a target position can be performed without expending time on a seek operation even when virtual circular control is performed using an eccentric disk.

DESCRIPTION OF THE PREFERRED EMBODIMENTS

A preferred embodiment of the present invention will be described below with reference to the drawings.

Figure 1:
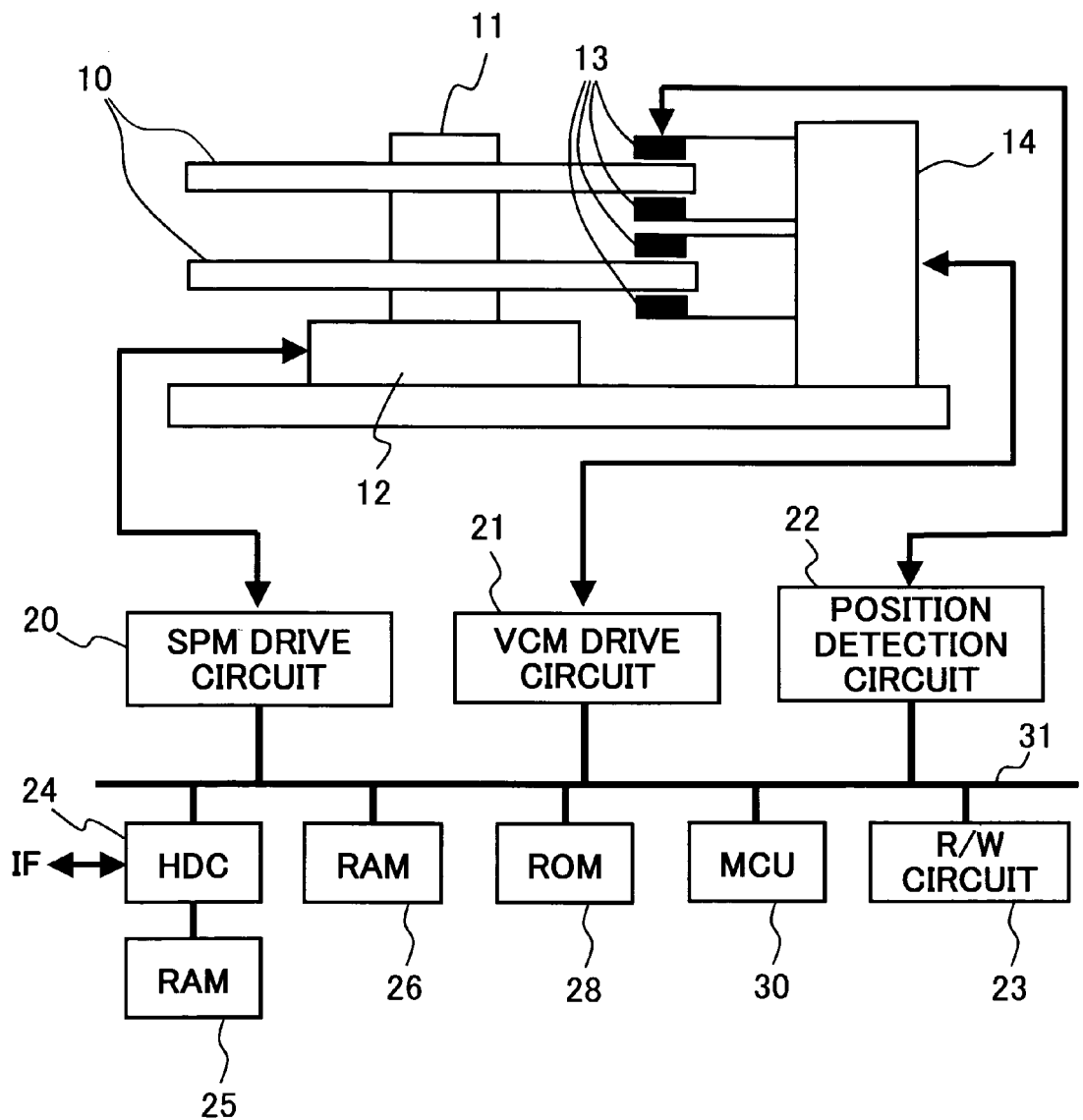
FIG. 1 shows a configuration example of a magnetic disk device to which the present invention is applied.

FIG. 1 shows a configuration example of a magnetic disk device to which the present invention is applied. A hard disk drive is used as an example of the disk device.

As shown in FIG. 1, the magnetic disk device 1 has a magnetic disk 10, a spindle motor 12, a magnetic head 13, and an actuator 14.

The magnetic disk 10 is disposed on a rotation axis 11 of the spindle motor 12. The spindle motor 12 rotates the magnetic disk 10 via the rotation axis 11.

The magnetic head 13 is comprised of read elements and write elements, and reads data from and writes data to the magnetic disk 10.

The actuator 14 is comprised of a voice coil motor (VCM), which rotates with an internal rotation axis as the center. The actuator 14 also has the magnetic head 13 on a tip end thereof, and is capable of moving the magnetic head 13 in the radial direction of the magnetic disk 10.

In the example shown in FIG. 1, two magnetic disks 10 are mounted on the magnetic disk device 1, and four magnetic heads 13 are simultaneously driven by the same actuator 14.

The magnetic disk device 1 further has a spindle motor (SPM) drive circuit 20, a voice coil motor (VCM) drive circuit 21, a position detection circuit 22, a read and write (R/W) circuit 23, a hard disk controller (HDC) 24, first and second random access memories (RAM) 25, 26, a read-only memory (ROM) 28, and a microcontroller (MCU) 30. Apart from the first RAM 25, these components are connected to each other via a bus 31.

The SPM drive circuit 20 drives the spindle motor 12 on the basis of a control signal from the MCU 30. The VCM drive circuit 21 supplies a drive current to the actuator 14, and drives the actuator 14, on the basis of the control signal from the MCU 30.

The position detection circuit 22 converts a position signal (servo signal hereafter) read by the magnetic head 13 from the magnetic disk 10 into a digital signal. The R/W circuit 23 controls the reading and writing operations of the magnetic head 13.

The HDC 24 judges a position within a track based on the sector number of the servo signal, and records and reproduces data. The HDC 24 communicates with a host via interface (IF) such as by ATA or SCSI.

The first RAM 25 is a memory for the HDC 24, and temporarily stores read data read by the magnetic head 13 and write data to be written to the magnetic disk 10 by the magnetic head 13. The second RAM 26 is a memory for the MCU 30, and temporarily stores data used by the MCU 30 to perform various calculations.

The ROM 28 stores a control program of the MCU 30 and various tables to be described below. The MCU 30 detects (demodulates) a current position from the servo signal obtained from the position detection circuit 22 by reading the control program and so on from the ROM 28 and executing, and outputs a control signal to the VCM drive circuit 21 in accordance with the error between the detected current position and a target position. In other words, the MCU 30 performs position demodulation and servo control.

Figure 2:
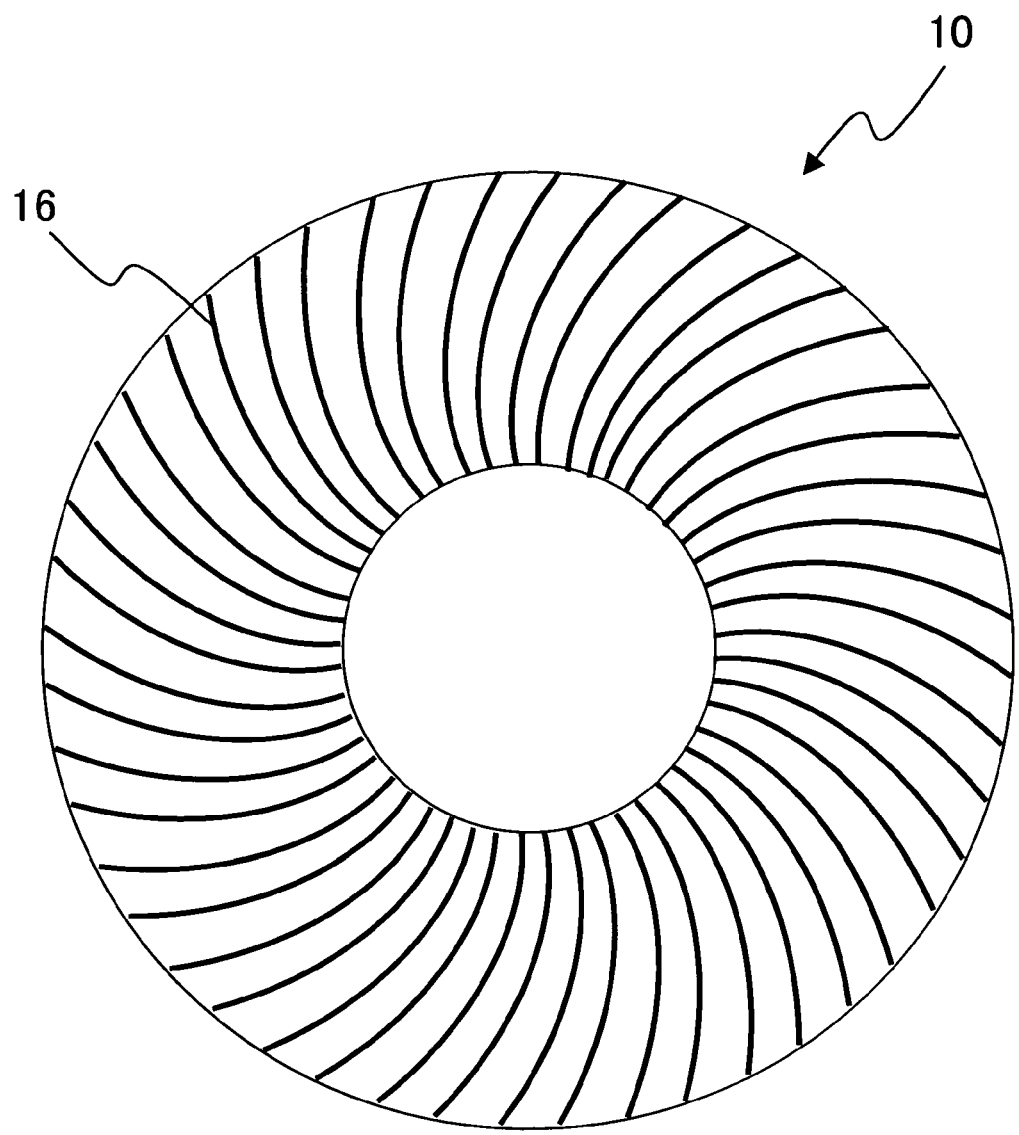
FIG. 2 shows an example of the recorded positions of position signals recorded on the magnetic disk.

FIG. 2 shows an example of the arrangement of servo signals 16 recorded on the magnetic disk 10. As shown in FIG. 2, the servo signals 16 are arranged at equal intervals from the inner perimeter to the outer perimeter of the magnetic disk 10. The magnetic disk device 1 can detects the current position of the magnetic head 13 and so on by reading the servo signal 16. Note that the servo signals 16 are recorded by an external device other than the magnetic disk device 1.

Figure 3:
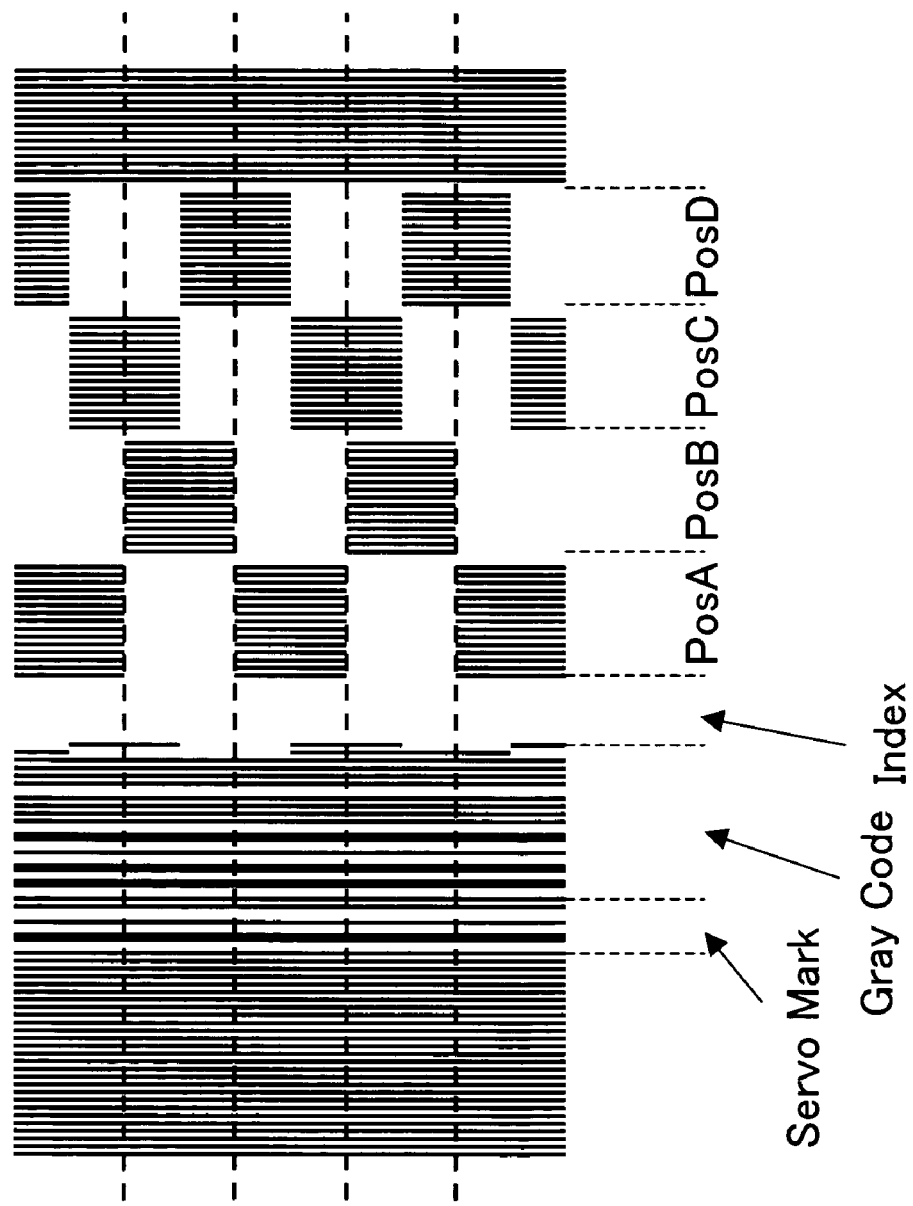
FIG. 3 shows an example of a position signal recording format.

FIG. 3 shows an example of a servo signal recording format. As shown in FIG. 3, the servo signal is comprised of a servo mark (Servo Mark) indicating a starting position of the servo signal, a gray code (Gray Code) indicating a track number, an Index signal (Index) indicating an index of the servo signal, and four offset signals (PosA, PosB, PosC, PosD).

Figure 4:
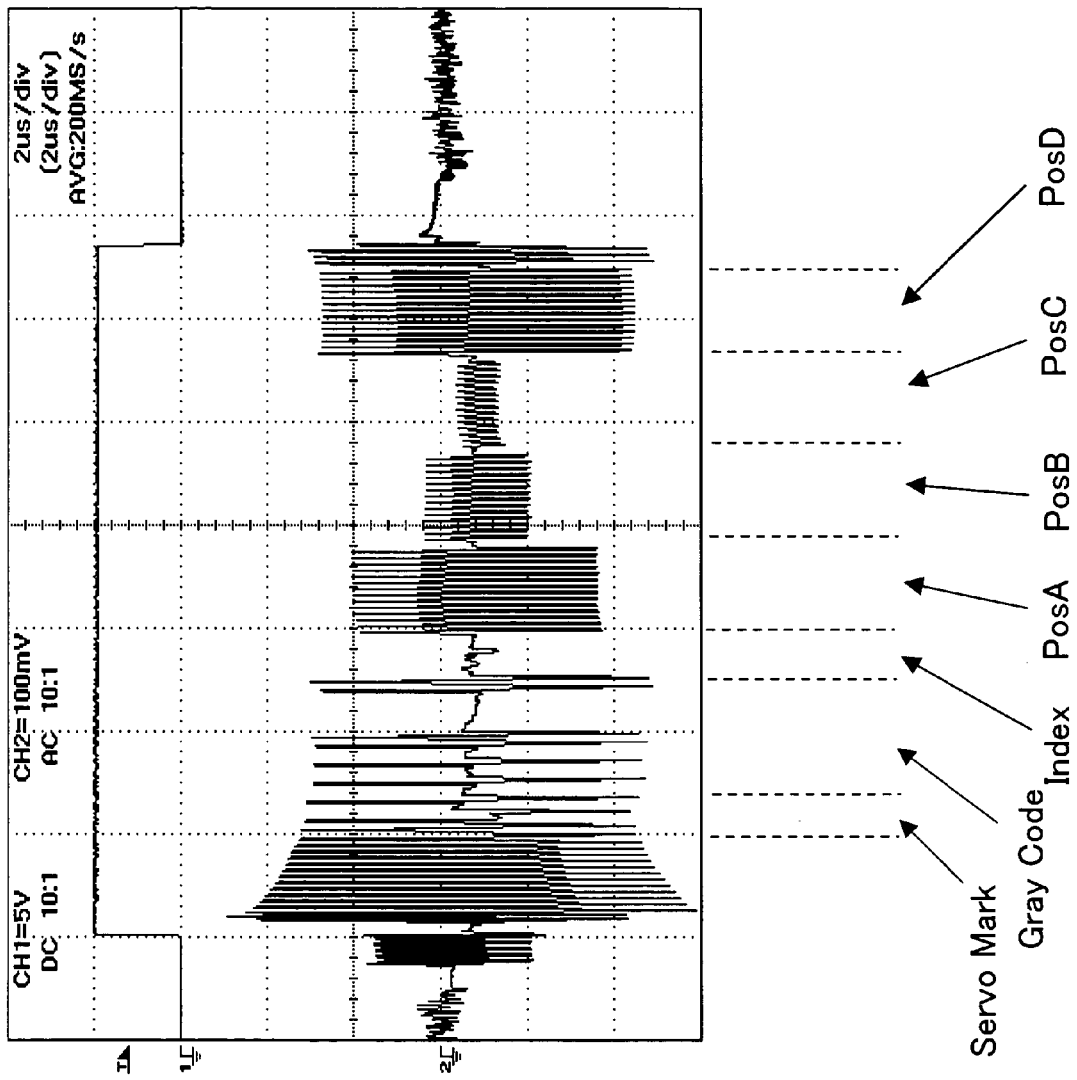
FIG. 4 shows an example of a waveform diagram when a position signal is read.

FIG. 4 shows an example of a signal waveform diagram obtained when the servo signal is read by the magnetic head 13. The MCU 30 detects the position of the magnetic head 13 using this waveform.

More specifically, the radial direction position of the magnetic head 13 is detected by the MCU 30 using the track number Gray Code and the offset signals PosA to PosD.

A circumference direction position of the magnetic head 13 is detected from the index signal Index. For example, the MCU 30 sets the sector number to "0" upon detection of the index signal Index, and obtains each sector number of the track by incrementing the sector number every time a servo signal is detected.

Note that the signal waveform example shown in FIG. 4 is obtained when the movement velocity of the magnetic head 13 is "0" (during tracking, for example).

Figure 5:
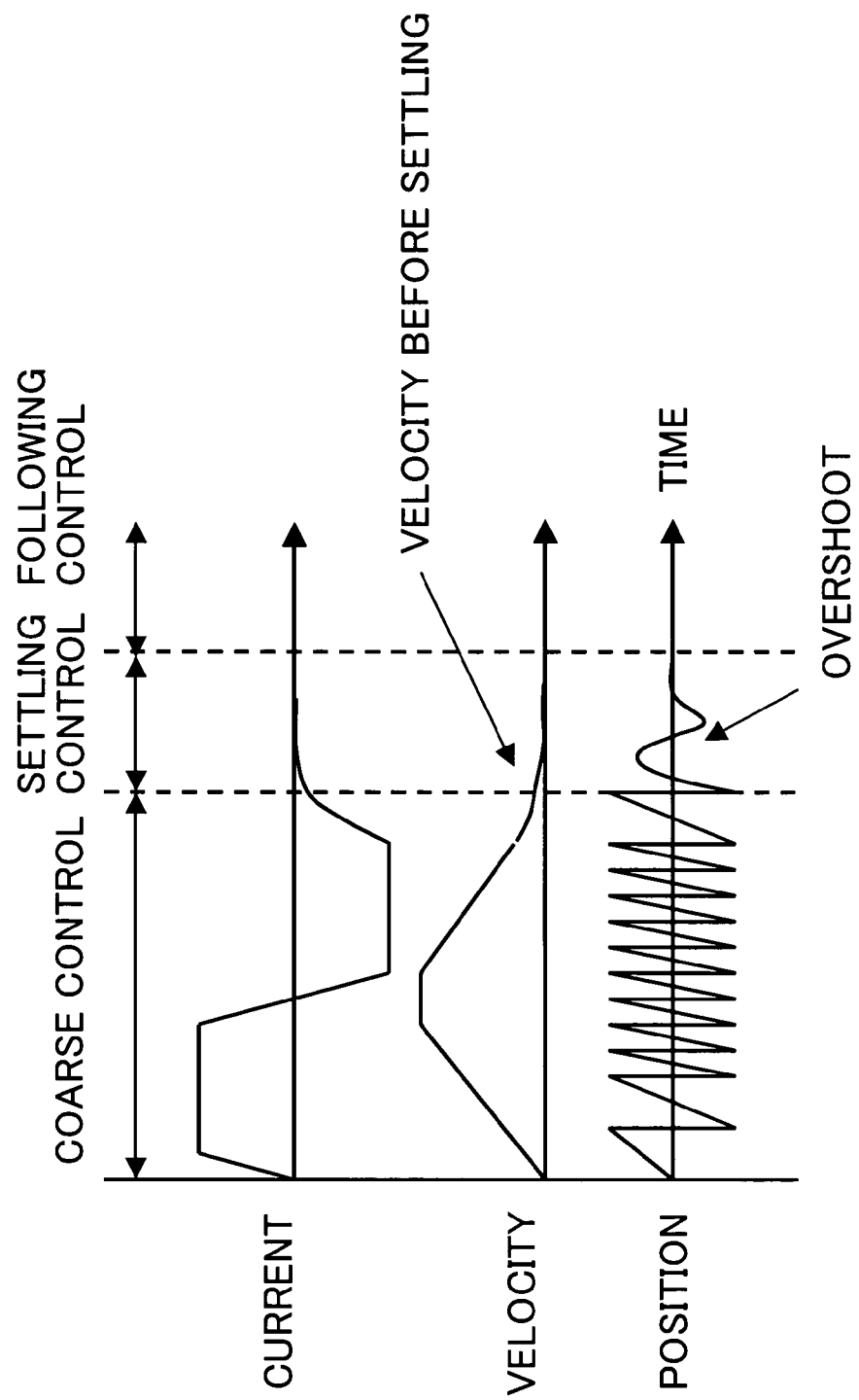
FIG. 5 shows an illustrative view of a seek operation.

FIG. 5 shows an example of seek control of the actuator 14, performed by the MCU 30. FIG. 5 shows transitions of seek control for moving the magnetic head 13 from a certain track position to a target track position, the current flowing through the actuator 14, the movement velocity of the magnetic head 13, and the position of the magnetic head 13.

The magnetic head 13 can be moved to the target position by transiting as coarse control, settling control, and following control. The coarse control is velocity control to the target position, while the settling control and the following control are position control to the target position. The current position of the magnetic head 13 must be detected during all of these control operations.

The current position (demodulated position, hereafter) Position is detected by the MCU 30 in the following manner. The MCU 30 extracts the track number Gray Code and offset signals PosA to PosD from the servo signal, and calculates two-phase servo signals PosN, PosQ using the following equations.

$$PosN = PosA - PosB \quad (1)$$

$$PosQ = PosC - PosD \quad (2)$$

Absolute values abs of PosN and PosQ are then compared, and when abs (PosN)≦abs (PosQ), the demodulated position Position is obtained using the following equation.

$$Position = -sgn(PosQ) \times PosN + Track \quad (3)$$

Here, sgn( ) denotes the sign of ( ), and Track denotes the track number Gray Code.

Note that when $sgn(PosQ) \times even(Track) > 0.0$, Position+=$sgn(PosQ) \times sgn(PosN) \times 1.0$ (4)

is added to Equation (3).

Meanwhile, when it is not abs (PosN)≦abs(PosQ), the demodulated position Position is as follows.

$$Position = sgn(PosN) \times (PosQ + even(Track) \times 0.5) + Track \quad (5)$$

Here, even (Track) is "1" when the track number is even, and "0" when the track number is odd.

Note that the calculation formulae described above are examples of formulae for obtaining the demodulated position Position, and the calculation formulae described in the aforementioned Japanese Patent No. 3,683,155 and Japanese Patent Laid-Open 2004-39116, for example, may be used.

Figure 6:
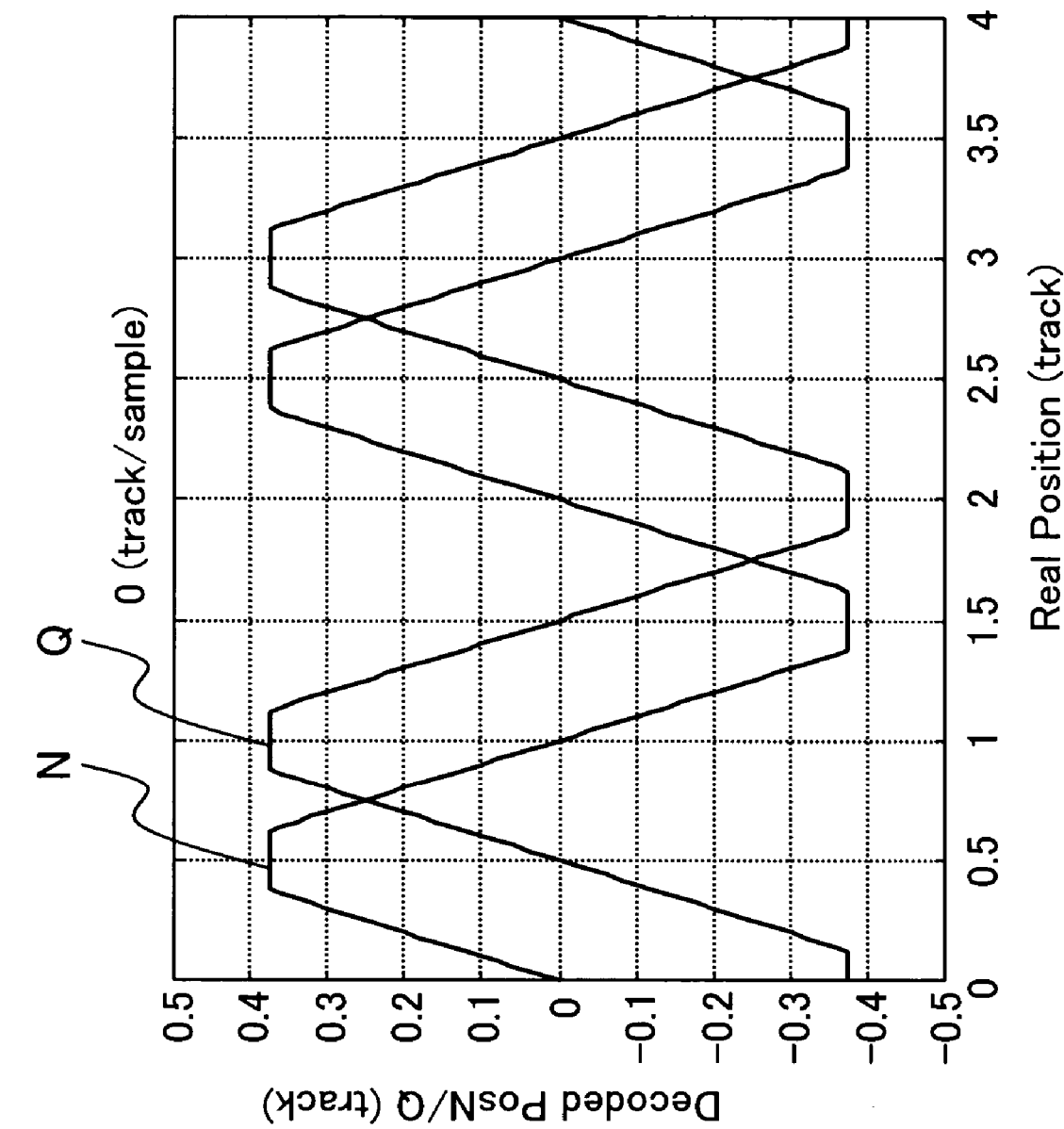
FIG. 6 shows a relationship diagram of PosN, PosQ when a relative velocity is 0.

FIG. 6 shows the relationship between the two-phase servo signals PosN, PosQ obtained in Equations (1) and (2) and the actual track position. Note that in this relationship, it is assumed that the servo signal is detected when the velocity of the magnetic head 13 is "0". The relationship between the demodulated position Position, obtained from PosN, PosQ through calculation using Equations (3) and (5), and the actual track position may be expressed in linear form, and the demodulated position Position and actual track position substantially match.

Figure 7:
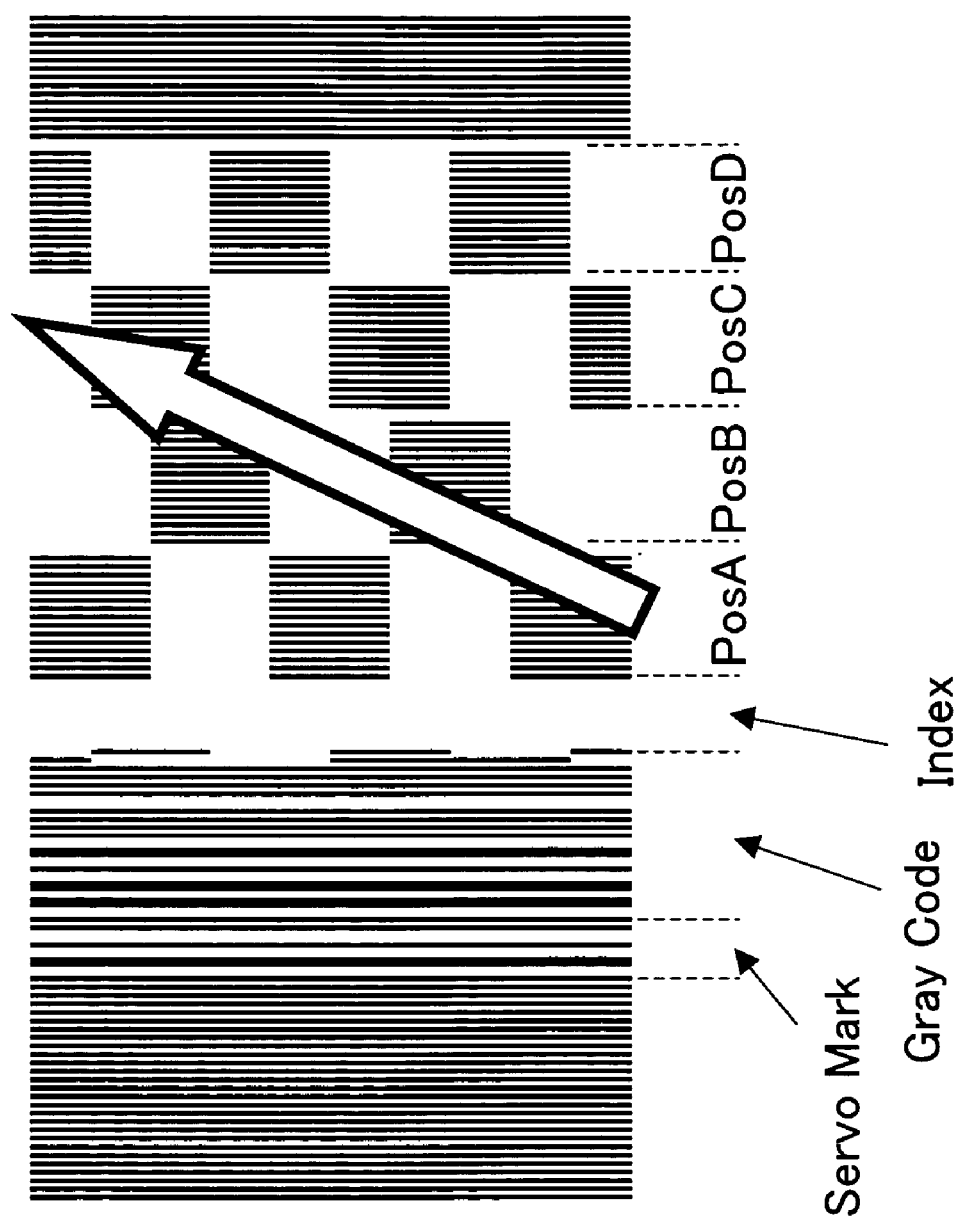
FIG. 7 shows an example in which a magnetic head traverses an area recorded with a position signal at speed.

However, during the seek control, the magnetic head 13 is in motion, and hence the velocity thereof is not "0". In this case, the magnetic head 13 moves diagonally across the area recorded the servo signal as shown in FIG. 7.

When the offset signals PosA to PosD are detected in this situation and the two-phase servo signals PosN, PosQ are calculated using Equations (1) and (2), the phases of the servo signals PosN, PosQ shift because passage times of the magnetic head 13 which detects the offset signals PosA to PosD are different and detection positions are different.

Figure 8:
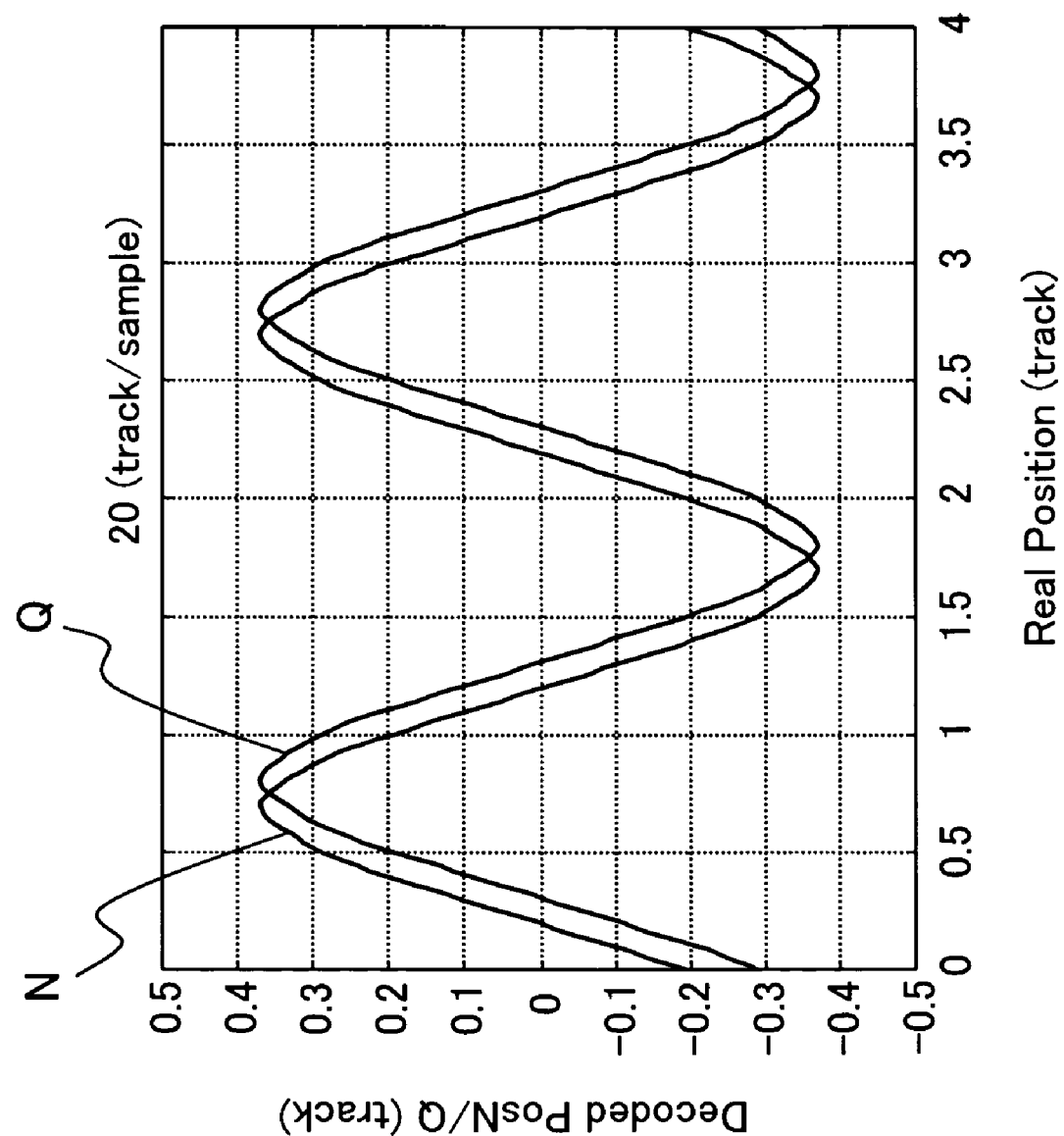
FIG. 8 shows a relationship diagram of PosN, PosQ when the relative velocity is 20track/sample.

FIG. 8 shows the relationship between the two-phase servo signals PosN, PosQ and the actual track position when the velocity of the magnetic head 13 (or the actuator 14) is "20 (track/sample)". It is evident from FIG. 8 that the phases of PosN and PosQ are closer together than in FIG. 6.

Figure 9:
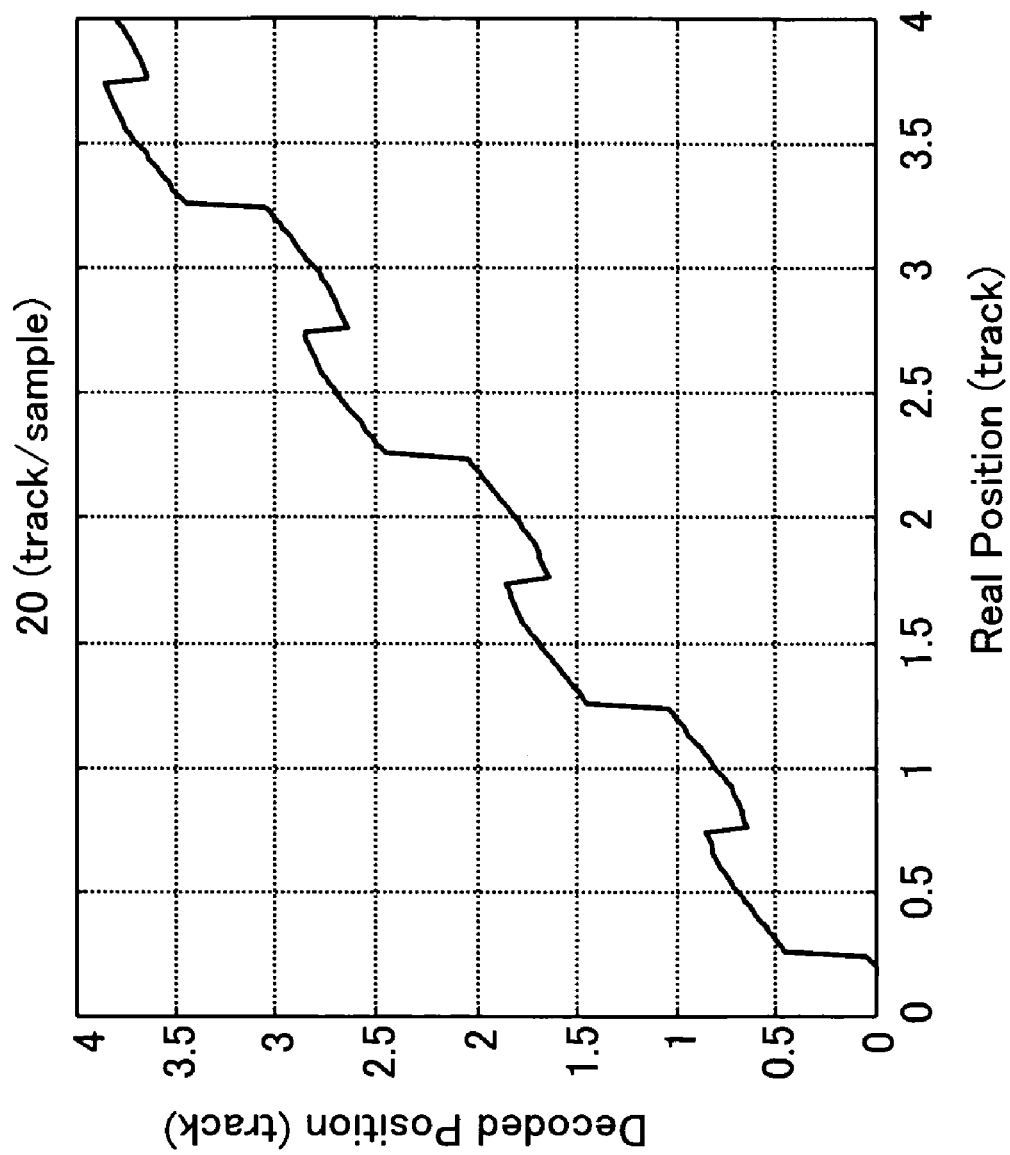
FIG. 9 shows a relationship diagram of a demodulated position in the case of FIG. 8.

The relationship between the demodulated position Position and the actual position in this case is shown in FIG. 9. As shown in FIG. 9, the actual position and demodulated position Position fail to match in several locations.

Figure 10:
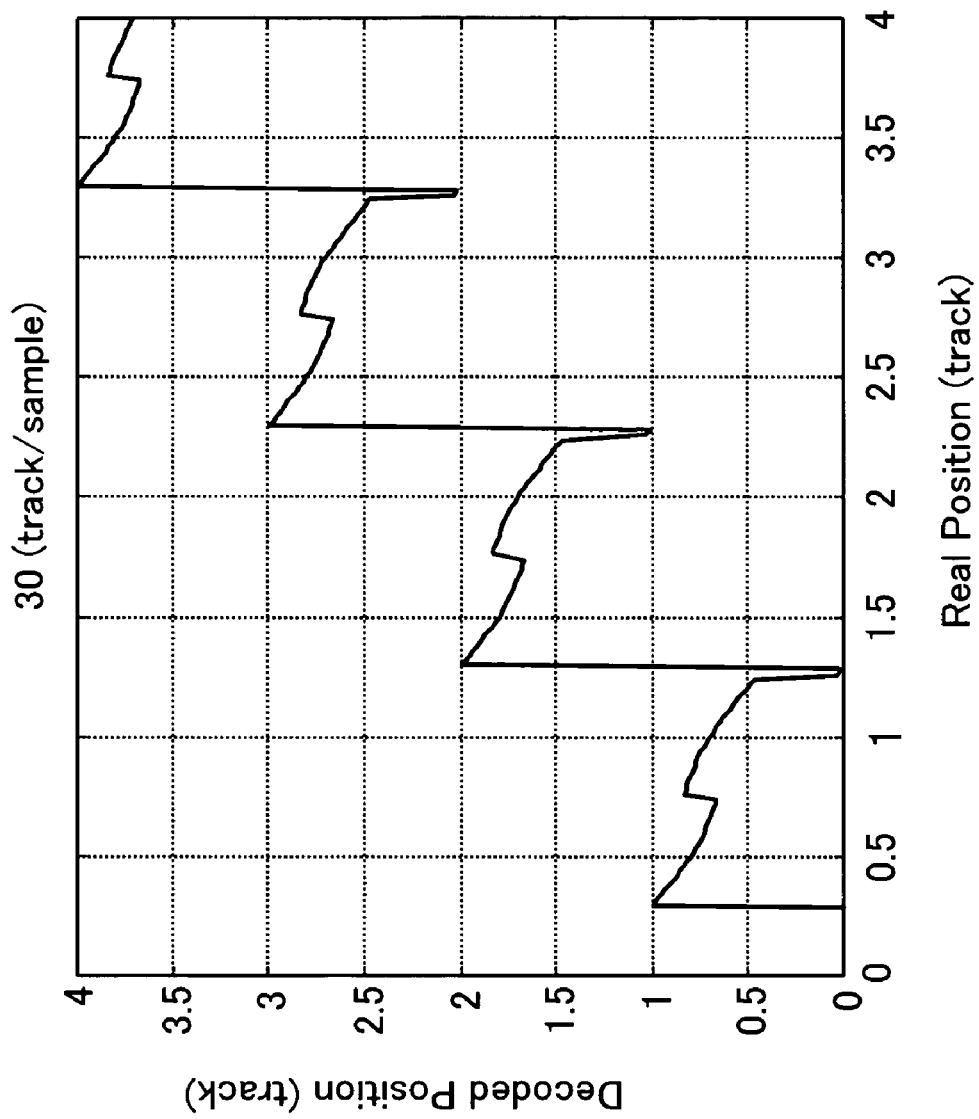
FIG. 10 shows a relationship diagram of a demodulated position when the relative velocity is 30track/sample.

When the velocity of the magnetic head 13 increases further, the phases of the two servo signals PosN and PosQ reverse, and the demodulated position Position and actual position no longer match. FIG. 10 shows an example of the relationship between the demodulated position Position and the actual position when the velocity of the magnetic head 13 is "30 (track/sample)".

The velocity of the magnetic head 13 (or the actuator 14) at which the phases of PosN and PosQ reverse will be referred to in this embodiment as the critical velocity.

Figure 11A:
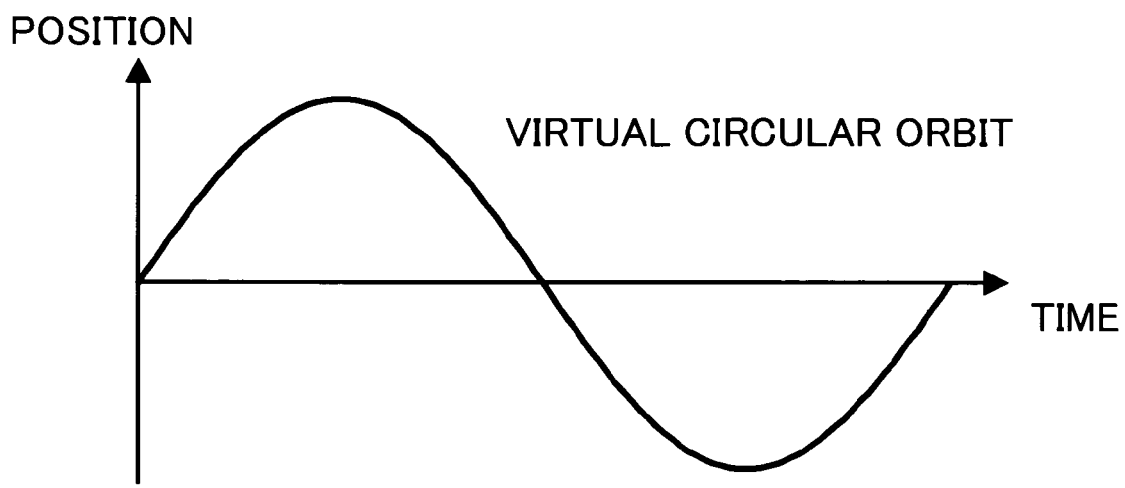
FIG. 11A shows an example of a virtual circular orbit.

Next, virtual circular control will be described. FIG. 11A shows a orbit (an observation position above the magnetic head 13) obtained when the servo signal 16 recorded on the magnetic disk 10 is read while the velocity of the magnetic head 13 is "0". Due to eccentricity, a constant orbit is depicted as shown in the drawing (the eccentric orbit becoming a sine wave (sine curve) orbit). Hence, by controlling the actuator 14 such that the magnetic head 13 follows this orbit, the eccentricity can be avoided. In this embodiment, this type of orbit will be referred to as a virtual circular orbit, and control to move the magnetic head 13 (or the actuator 14) in this manner will be referred to as virtual circular control.

Figure 11B:
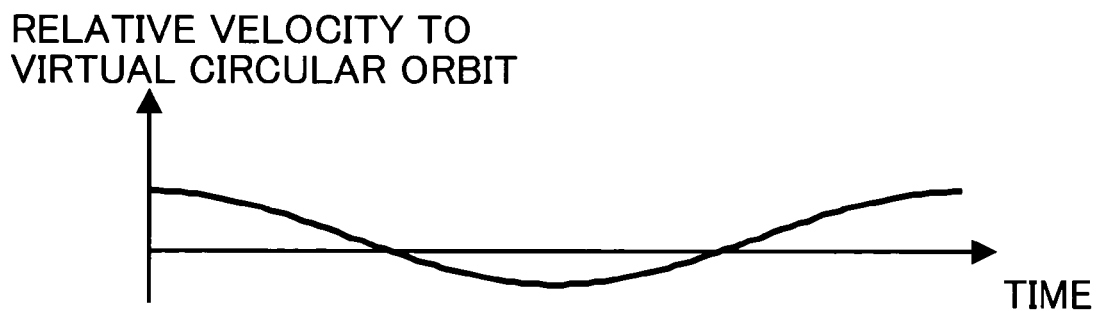
FIG. 11B shows an example of the relative velocity to the virtual circular orbit.

FIG. 11B shows the relative velocity to the virtual circular orbit. The recording area of the servo signal from the observation position moves at the velocity shown in FIG. 11B. With virtual circular control, the magnetic head 13 (or actuator 14) is controlled such as moving at the velocity shown in FIG.

11B. Note that the relative velocity shown in FIG. 11B can be obtained by subjecting the orbit shown in FIG. 11A to time differentiation.

The examples shown in FIGS. 11A and 11B are examples of virtual circular control performed on a single surface of the magnetic disk 10. Typically, a plurality of the magnetic disks 10 are mounted in the disk device 1and virtual circular control must be performed on the front surface and rear surface of each magnetic disk 10. Therefore, virtual circular control must be performed on each surface.

Figure 12A:
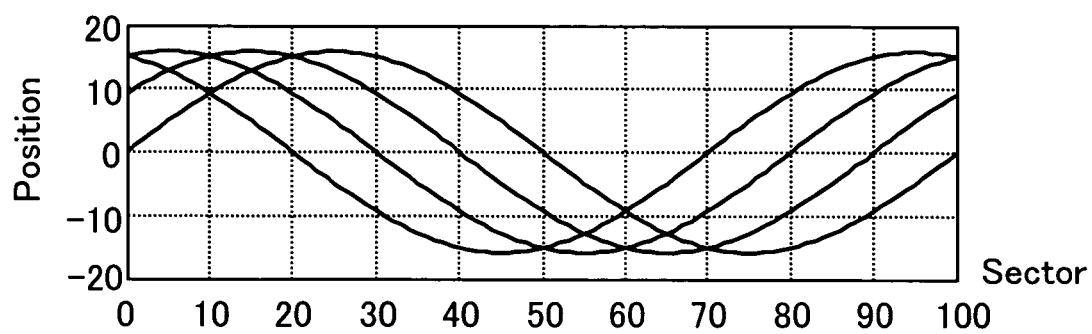
FIG. 12A shows an example of virtual circular orbits relating to four respective surfaces.
Figure 12B:
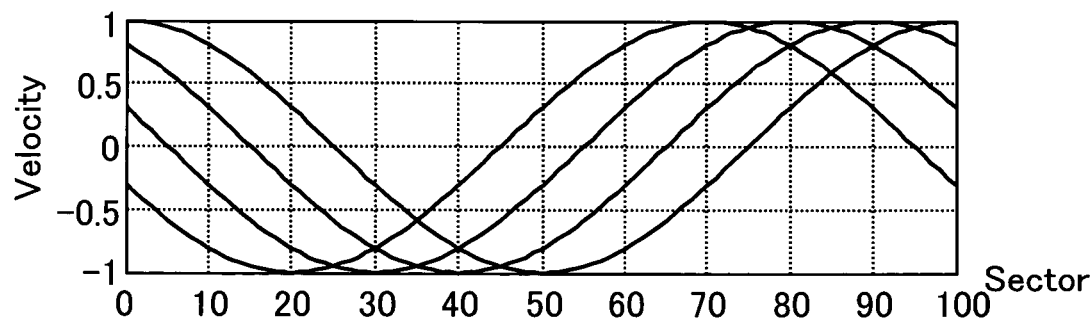
FIG. 12B shows an example of the relative velocity to these virtual circular orbits.

FIGS. 12A and 12B show examples thereof. The four orbit lines indicate the front surface and rear surface of two magnetic disks 10, making a total of four surfaces on which virtual circular control is performed. The example in FIG. 12A shows four virtual circular orbits having identical amplitudes and deviating phases. Control must be performed such that the virtual circular orbit is drawn on each surface. Furthermore, as shown in FIG. 12B, the actuator 14 is controlled to move the magnetic head 13 at a velocity shown in FIG. 12B to each surface.

The velocity range of each surface extends from "−1" to "+1", as shown in FIG. 12B. Needless to say, the velocity range must be within the range of the critical velocity for obtaining the demodulated position Position accurately. However, as shown in FIG. 12B, when virtual circular control is performed to correspond to each surface, the margin in which the velocity range shown in FIG. 12B is subtracted from the critical velocity range becomes small, as will be described below, and the duration of the seek operation increases because the velocity of the magnetic head 13 must be reduced as the magnetic head 13 approaches the target position.

Therefore, in this embodiment a shared average orbit is obtained by averaging the virtual circular orbits of each surface. Subtracted orbits are generated by subtracting the virtual circular orbits of each surface from the average orbit. Generated respective orbits are position orbits applied to the respective disk surfaces.

The MCU 30 controls the actuator 14 to follow the position orbit. In actuality, a position error up to the target position is determined by subtracting the demodulated position from the generated orbit, and this subtraction value serves as a control amount applied to the actuator 14.

Figure 13A:
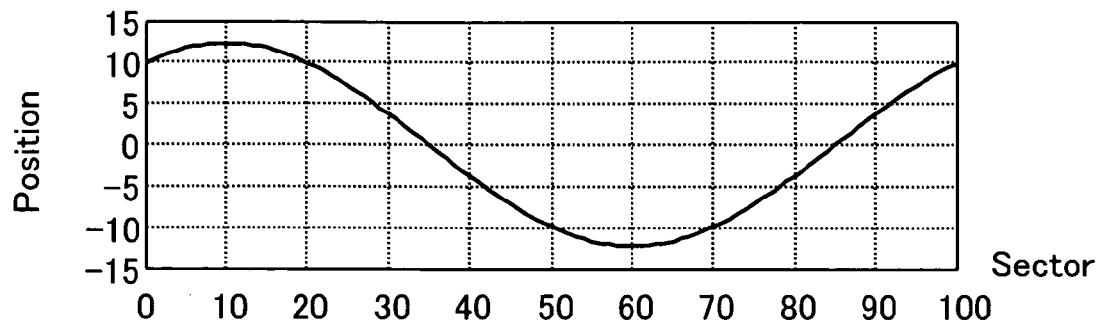
FIG. 13A shows an example of an average orbit.
Figure 13B:
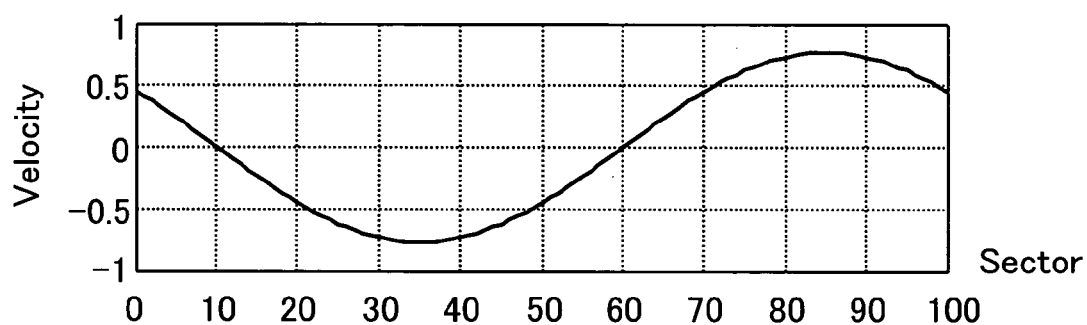
FIG. 13B shows an example of the relative velocity to the average orbit.

FIG. 13A shows the average orbit of the virtual circular orbits shown in FIG. 12A. By determining the average orbit of the virtual circular orbits applied to the respective surfaces, the average orbit common to each surface is obtained. FIG. 13B shows the velocity range of the average orbit.

Figure 14A:
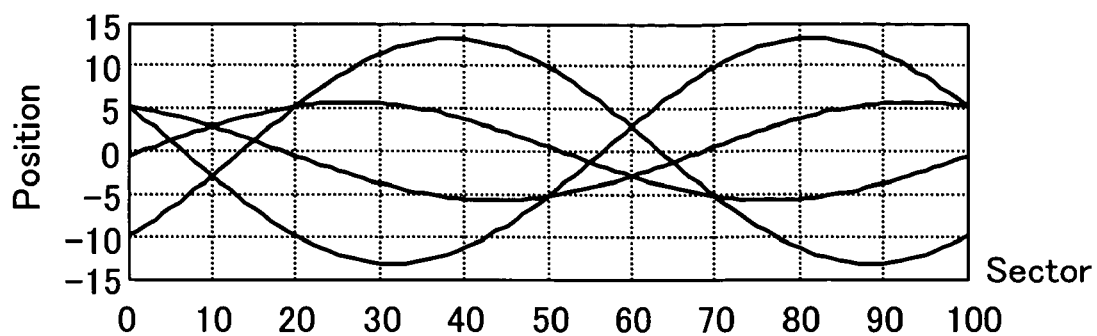
FIG. 14A shows an example of orbits obtained by subtracting an average orbit from the virtual circular orbits of four respective surfaces.
Figure 14B:
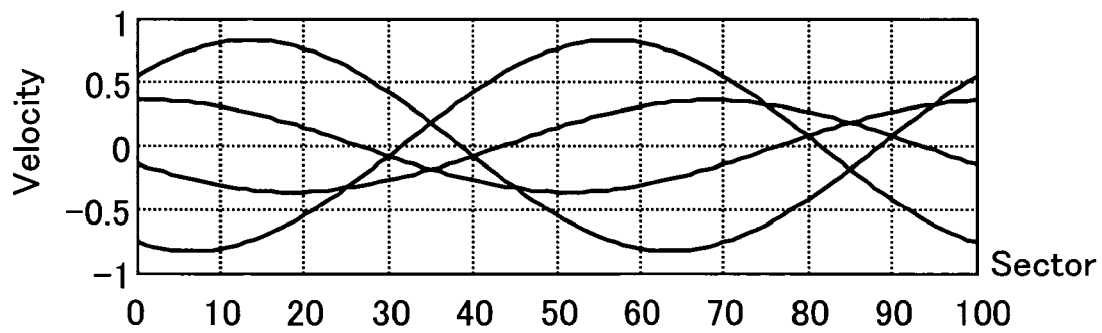
FIG. 14B shows an example of the relative velocity to these subtracted orbits.

FIG. 14A shows an example of the subtracted orbits obtained by subtracting the average orbit common to each surface (FIG. 13A) from the virtual circular orbits (FIG. 12A) to be applied to each surface. The orbits shown in FIG. 14A are a final position orbits applied to the respective disk surfaces. FIG. 14B shows the velocity range of the orbits.

As shown in FIG. 14B, the velocity range of the orbits obtained by subtracting the average orbit from the virtual circular orbits to be applied to the respective surfaces extends from approximately "−0.8" to "+0.8", which is narrower than the range shown in FIG. 12B. Hence, by taking the average orbit common to each surface (FIG. 14B), the margin to the critical velocity can be made larger than that of a case in which the virtual circular orbit of each surface is taken (FIG. 12B). Accordingly, the seek operation can be performed in a short time period.

Figures 15A, 15B, 15C:
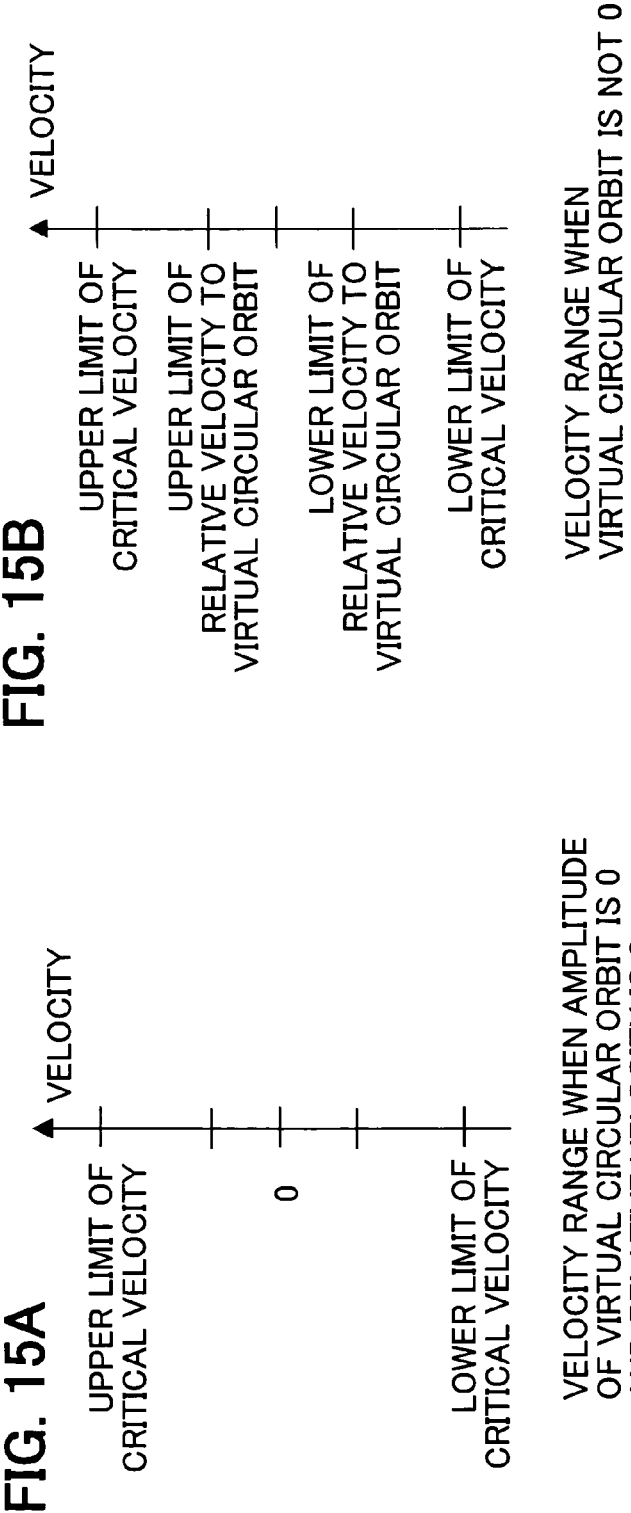
FIG. 15A shows an example of a velocity range when the amplitude of the virtual circular orbit is "0" and the relative velocity is "0"
FIG. 15B shows an example of the velocity range when the virtual circular orbit is not "0"
FIG. 15C shows an example of the velocity range seen from above the virtual circular orbit.

FIGS. 15A through 15C show examples of the velocity range. FIG. 15A shows an example of the upper limit and lower limit of the critical velocity when the amplitude of the virtual circular orbit is "0" and the relative velocity is "0", i.e. when a non-eccentric disk is used. When the actuator 14 is controlled with the range of this critical velocity, the phases of the two-phase servo signals PosN, PosQ do not reverse, and the position can be demodulated accurately.

FIG. 15B shows an example of the velocity range of the virtual circular orbit when the amplitude of the virtual circular orbit and the relative velocity is not "0", i.e. when the magnetic disk 10 having eccentricity is used.

When virtual circular control corresponding to each surface is performed without determining the average orbit, the velocity range extends from "−1" to "+1", as shown in the example in FIG. 12B. On the other hand, when virtual circular control corresponding to the average orbit is performed, the velocity range extends from "−0.8" to "+0.8", as shown in the example in FIG. 13B. Hence, the velocity range of the virtual circular orbit shown in FIG. 15B is narrower when the average orbit is determined. Accordingly, the range from the upper limit or lower limit velocity of the virtual circular orbit to the upper limit or lower limit of the critical velocity is larger when the average orbit is determined.

In other words, the velocity range from above the virtual circular orbit (from the observation position) becomes wider when virtual circular control using the average orbit is performed than when virtual circular control corresponding to each surface is performed. Accordingly, the range between the upper limit and lower limit of the critical velocity from above the virtual circular orbit also widens.

As shown in FIG. 15C, for example, the upper limit and lower limit of the critical velocity widen when the average orbit is applied, and the velocity of the magnetic head 13 to the target position becomes fast. Hence, the target position can be accessed quickly without expending time on the seek operation. Furthermore, the speed of data recording and reproducing to the magnetic disk 10 becomes fast correspondingly, and an improvement in recording density can also be achieved.

Figure 16:
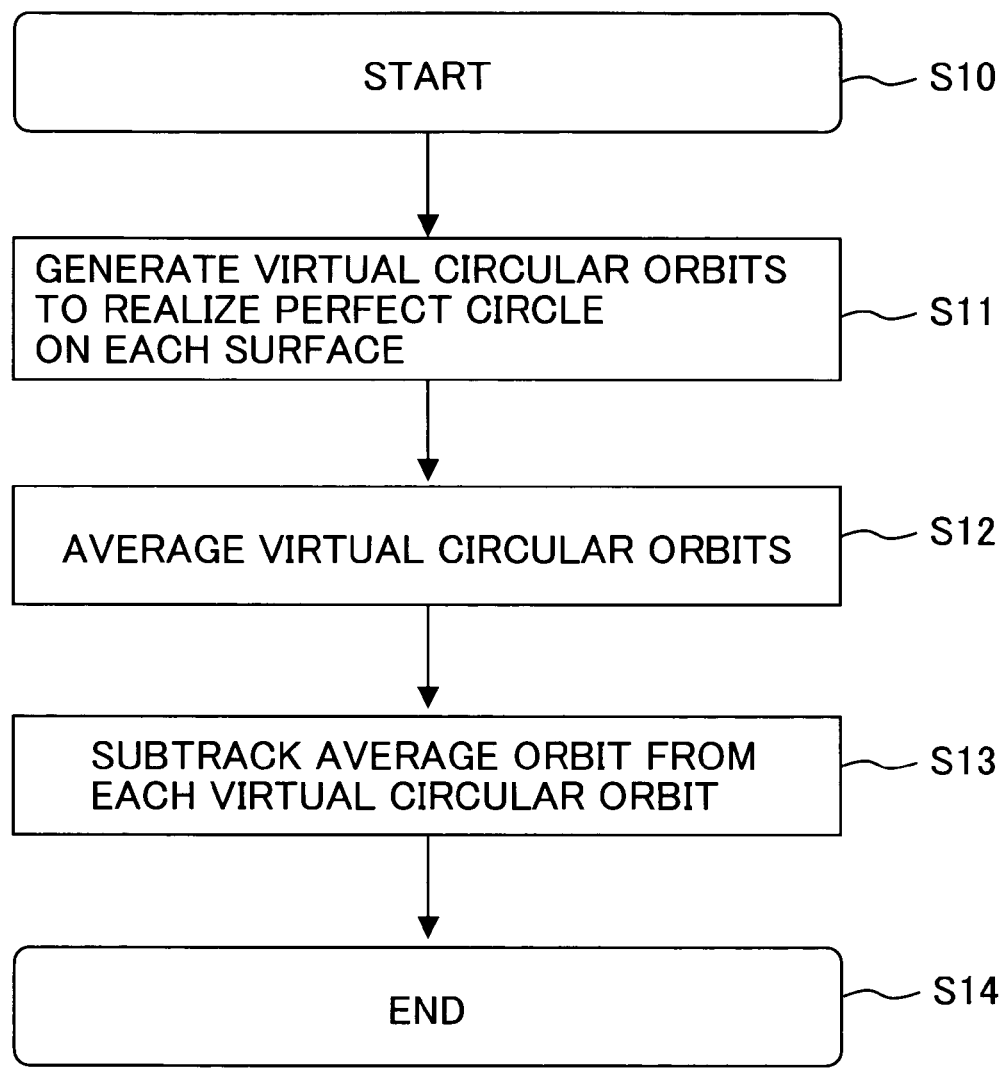
FIG. 16 shows an example of a flowchart of processing for generating an average orbit.

FIG. 16 is an example of processing executed by the MCU 30 to determine the average orbit. First, the MCU 30 begins the processing by reading the control program from the ROM 28 and so on (S10).

Next, the MCU 30 generates virtual circular orbits to realize a perfect circle on each surface (S11). For example, the orbits shown in FIG. 12A are generated.

Next, the MCU 30 calculates the average orbit by averaging the generated virtual circular orbits (S12). For example, the average orbit shown in FIG. 13A is calculated.

Next, the average orbit is subtracted from each virtual circular orbit (S13). As a result of this subtraction, the orbit shown in FIG. 14A, for example, is obtained. This subtraction is performed to determine the position orbit to be applied ultimately to each disk surface.

The series of processes is then terminated (S14).

Figure 17:
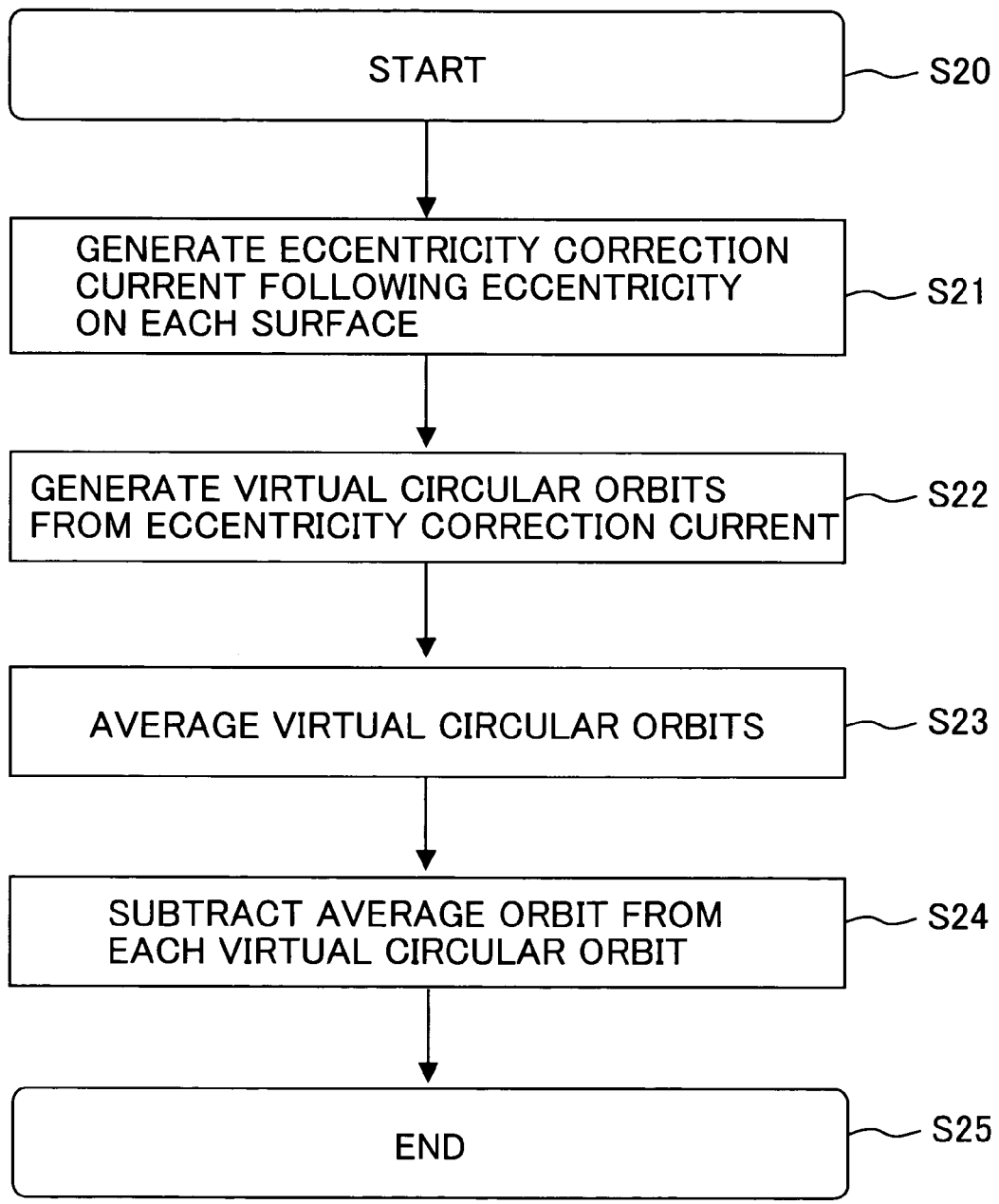
FIG. 17 shows an example of a flowchart of processing for generating an average orbit from an eccentricity correction current.

FIG. 17 shows an example of other processing executed by the MCU 30. In this case, the position orbit is generated from the eccentricity correction current. The eccentricity correction current is a current which flows through the actuator 14 such that the magnetic head 13 (or the actuator 14) follows the position orbit.

First, the MCU 30 begins the processing (S20), and generates an eccentricity correction current which follows the eccentricity on each surface (S21). For example, a current like sin wave is generated.

Next, virtual circular orbits are generated from the eccentricity correction current (S22). In this case, the virtual circular orbits can be obtained by subjecting the eccentricity correction current to time integration twice. As a result, the position orbits shown in FIG. 12A, for example, are obtained.

Next, the MCU 30 determines the average orbit by averaging the virtual circular orbits of the respective surfaces (S22), and then determines the position error by subtracting the average orbit from each virtual circular orbit (S24). The series of processes is then terminated (S25)

Thus, the average orbit may be determined not only from the virtual circular orbit to be applied to each surface, but also from the eccentricity correction current value to be applied to each surface.

Figure 18:
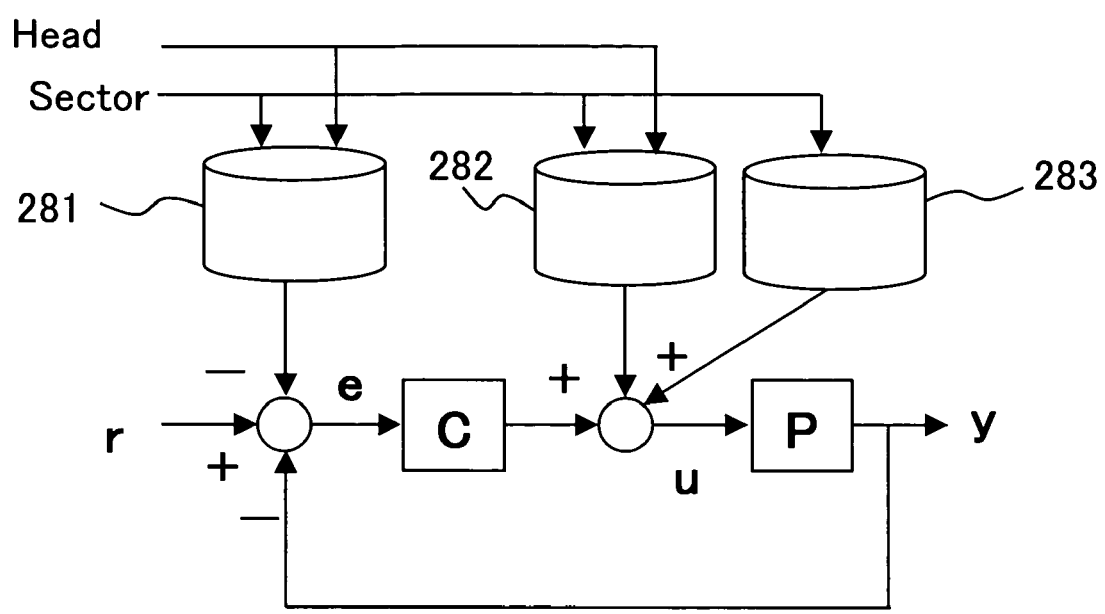
FIG. 18 shows a configuration example a position control system.

FIG. 18 shows a configuration example of a position control system. Three tables 281 to 283 are stored in the ROM 28, for example.

The first table 281 stores different virtual circular orbit (the orbit obtained by subtracting the average orbit from the virtual circular orbit to be applied to each surface) for each magnetic head 13. For example, the orbits shown in FIG. 14A are stored. The second table 282 stores eccentricity correction current values for each head. Here, the eccentricity correction current value is a correction current value for returning the magnetic head 13 to its initially set virtual circular orbit when positional deviation occurs between the magnetic disks 10 by secular changes in the magnetic disk device 1. The third table 283 stores the eccentricity correction current value common to each head, which corresponds to the position orbit obtained by averaging the virtual circular orbits. More specifically, the eccentricity correction current value common to each head can be obtained by subjecting the average orbit to time differentiation twice.

A feature of the configuration shown in FIG. 18 is the provision of the third table 283. The magnetic disk device 1 performs virtual circular control using a value obtained by adding the eccentricity correction current value to the current value stored in the third table 283 as the current to be applied to the actuator 14.

Note that virtual circular orbits which is difference to each head

Note that the different virtual circular orbit which is stored in the first table 281 for each head is obtained by a head number and a sector number. As shown in FIG. 14A, when a plurality of heads exist, a plurality of virtual circular orbits corresponding to the heads also exist, and hence the head number specifies one of the orbits. The sector number is used to obtain the position on the virtual circular orbit corresponding to the sector number, as shown in FIG. 14A.

The eccentricity correction current which is stored in the second table 282 for each head is similar. Note, however, that only the sector number is required to obtain the average orbit stored in the third table 283. This is because the position on the average orbit can be obtained from the sector number alone, as shown in FIG. 13A.

Referring to FIG. 18, the overall control system is a feedback control system which determines the observation position (current position) y in respect to the target position r and returns the observation position y to the target position r.

First, the previously determined observation position y is subtracted from the target position r to determine the position error. The different orbit for each head stored in the first table 281 is also subtracted to determine the accurate position error e having the observation position on the virtual circular orbit. The position error e is applied to the MCU 30, which serves as a controller (C).

The MCU 30 adds the eccentricity correction current value of each head stored in the second table 282 to the eccentricity correction current value common to each head stored in the third table 283, and thereby determines the current value u flowing through the actuator 14. This value u is applied to the actuator 14, which serves as a plant (P).

The observation position y of the actuator 14 (or the magnetic disk 13) is then determined by the position detection circuit 22, for example, and fed back to the MCU 30. Seek control through virtual circular control is performed thereafter by repeating this routine.

Figure 19:
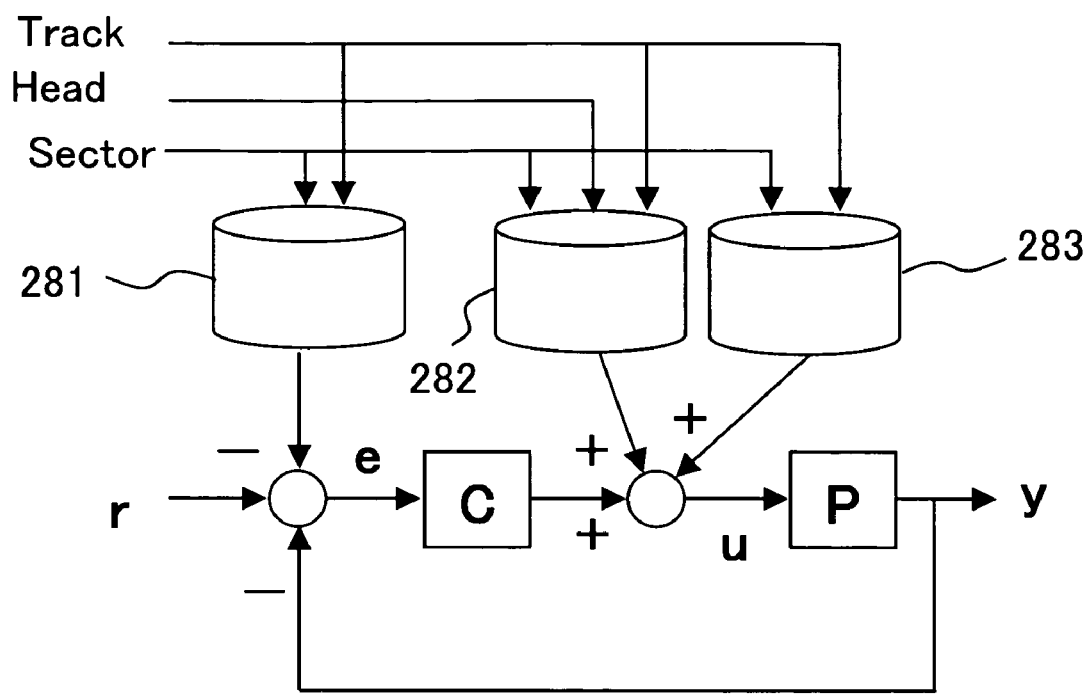
FIG. 19 shows a configuration example of a positioning control system in the use of a radial position.

FIG. 19 shows a configuration example of a position control system similar to that of FIG. 18, but in this example, different orbits and currents are applied from the respective tables 281 to 283 at the radial position of the magnetic disk 10.

As shown in FIG. 2, when the servo signal 16 is recorded on the magnetic disk 10, the recording position does not extend radially in a straight line from the center of the magnetic disk 10 to the outer perimeter, but instead extends in an arc form to the rotation direction. As a result, the velocity at which the magnetic head 13 passes the position of the servo signal 16 may differ according to the radial direction position, unlike in a case where the servo signal 16 is arranged so as to extend radially in a straight line from the center of the magnetic disk 10. Hence, by varying the orbit or current value according to the position in the radial direction of the magnetic disk 10, each value corresponding to the radial position can be obtained.

As shown in FIG. 19, track numbers indicating radial direction positions are applied to the respective tables 281 to 283. The first table 281 stores the orbit applied to each surface in accordance with the radial position of the magnetic disk 10. The second table 282 stores eccentricity correction current values corresponding similarly to radial positions. The third table 283 also stores the average orbit corresponding to the radial position. Each table 281 to 283 outputs a position or current value corresponding to the track number, the head number, and sector number. All other operations are same to those of the example shown in FIG. 18.

In the example described above, virtual circular control is performed using the average orbit relating to the four surfaces of the two magnetic disks 10. However, this embodiment is not limited to two magnetic disks 10, and can be applied to three, four, or more disks. Moreover, this embodiment may be applied to a number of surfaces corresponding to the number of disks, and can acquire similar operations and effects to those of the example described above.

Further, as regards the "relative velocity to the virtual circular orbit" in the above example, the velocity of the magnetic head 13 (or the actuator 14) is described as being "0" for ease of description. In other words, the velocity of the observation position above the virtual circular orbit (or above the magnetic head 13) is described as "0". The "relative velocity to the virtual circular orbit" is the velocity of the eccentric orbit in relation to the velocity of the virtual circular orbit, and hence when the magnetic head 13 moves, variation in the "relative velocity" thereof to the eccentric orbit increases. In this case, when eccentricity exists even if the velocity of the magnetic head 13 itself is same to the velocity of the eccentric orbit, the range between the upper limit and lower limit of the relative velocity to the virtual circular orbit widens, as shown in FIG. 15B, and as a result, it becomes impossible to obtain a margin to the critical velocity. However, similarly to the example described above, by determining the average orbit and performing virtual circular control on the basis thereof, the range between the upper limit and lower limit of the relative velocity can be narrowed and a large margin can be obtained. Accordingly, the target position can be accessed without expending time on the seek operation, similarly to the example described above.

Further, orbits having identical amplitudes and different phases are used in the above example as the virtual circular orbits that are applied to the respective surfaces, as shown in FIG. 12A. However, virtual circular orbits having different amplitudes and identical phases or virtual circular orbits having different amplitudes and different phases may of course be applied to the respective surfaces, and by obtaining the average orbit thereof and performing control on the basis of this orbit, similar operations and effects to those described above can be acquired.

Furthermore, in the example described above, the first through third tables 281 to 283 are described as being stored in the ROM 28. However, these tables 281 to 283 may be stored in a memory other than the ROM 28, such as the second RAM 26. Alternatively, each of the tables 281 to 283 may be stored in a different memory such that the third table 283 alone is stored in the second RAM 26 and so on. In all cases, similar operations and effects to those described above can be acquired.

Further, the first through third tables 281 to 283 may be stored on the magnetic disk 10, or the third table 283 alone (or the first table 281 alone or the second table 282 alone) maybe stored on the magnetic disk 10. By reading the table stored on the magnetic disk 10 using the magnetic head 13 and performing control using the MCU 30, similar operations and effects to those described above can be acquired.

Further, in the example described above the magnetic disk device 1 is used as an example of the disk device. However, this embodiment may be applied to the disk device other than the magnetic disk device, for example an optical disk device for a disk such as a CD or DVD or a magneto-optical disk device for a disk such as an MO or MD, whereby similar operations and effects can be acquired.

The above description is summarized in the following claims.

What is claimed is:

1. A control device for positioning a plurality of heads in a head position in relation to a plurality of disks, each of which is recorded in advance with a position signal, comprising:
a position orbit generation unit which calculates virtual circular orbits of said heads, each of which depicts a perfect circle centered on a rotary center of respective disk surfaces of each of said disks, calculates an average orbit by averaging said virtual circular orbits, and generates position orbits by subtracting said virtual circular orbits from said average orbit.

2. The control device according to claim 1, wherein said position orbit to each of said disk surfaces has a different value according to a radial direction position on each of said disks.

3. A control device for positioning a plurality of heads in a head position in relation to a plurality of disks, each of which is recorded in advance with a position signal, comprising:
a control unit which performs control such that an average orbit is calculated by averaging virtual circular orbits of said heads, each of which depicts a perfect circle centered on a rotary center of respective disk surfaces of each of said disks, a position orbit to each disk surface is calculated by subtracting said virtual circular orbits from said average orbit, said position orbit is subtracted from a demodulated position demodulated from said position signal on each of said disk surfaces, and each of said heads is positioned in relation to each of said disk surfaces on the basis of a resulting subtraction value.

4. The control device according to claim 3, wherein said position orbit to each of said disk surfaces has a different value according to a radial direction position on each of said disks.

5. The control device according to claim 3, further comprising a storage unit which stores a correction value corresponding to said average orbit,
wherein said control unit calculates said subtraction value by reading said correction value stored in said storage unit and subtracting said correction value from said demodulated position.

6. The control device according to claim 5, wherein said position orbit to each of said disk surfaces has a different value according to a radial direction position on each of said disks.

7. The control device according to claim 5, wherein said correction value has a different value according to a radial direction position on each of said disks.

8. A disk device for positioning a plurality of heads in a head position in relation to a plurality of disks, each of which is recorded in advance with a position signal, comprising:
an actuator for driving said heads;
a control unit which demodulates said position signal from said heads and controls said actuator; and
a position orbit generation unit which calculates virtual circular orbits of said heads, each of which depicts a perfect circle centered on a rotary center of respective disk surfaces of each of said disks, calculates an average orbit by averaging said virtual circular orbits, and generates position orbits by subtracting said virtual circular orbits from said average orbit.

9. A disk device for positioning a plurality of heads in a head position in relation to a plurality of disks, each of which is recorded in advance with a position signal, comprising:
an actuator for driving said heads; and
a control unit which demodulates said position signal from said heads and controls said actuator,
wherein said control unit controls said actuator such that an average orbit is calculated by averaging virtual circular orbits of said heads, each of which depicts a perfect circle centered on a rotary center of respective disk surfaces of each of said disks, a position orbit to each disk surface is calculated by subtracting said virtual circular orbits from said average orbit, said position orbit is subtracted from a demodulated position demodulated from said position signal on each of said disk surfaces, and each of said heads is positioned in relation to each of said disk surfaces on the basis of a resulting subtraction value.

10. A position orbit generating method for generating a position orbit in order to position a plurality of heads in a head position in relation to a plurality of disks, each of which is recorded in advance with a position signal, comprising the step of:
calculating virtual circular orbits of said heads, each of which depicts a perfect circle centered on a rotary center of respective disk surfaces of each of said disks, calculating an average orbit by averaging said virtual circular orbits, and generating position orbits by subtracting said virtual circular orbits from said average orbit.

11. A positioning control method for positioning a plurality of heads in a head position in relation to a plurality of disks, each of which is recorded in advance with a position signal, comprising the step of:
performing control such that an average orbit is calculated by averaging virtual circular orbits of said heads, each of which depicts a perfect circle centered on a rotary center of respective disk surfaces of each of said disks, a position orbit to each disk surface is calculated by subtracting said virtual circular orbits from said average orbit, said position orbit is subtracted from a demodulated position demodulated from said position signal on each of said disk surfaces, and each of said heads is positioned in relation to each of said disk surfaces on the basis of a resulting subtraction value.

* * * * *